(12) United States Patent
Wada

(10) Patent No.: US 6,454,438 B1
(45) Date of Patent: *Sep. 24, 2002

(54) ILLUMINATING APPARATUS AND PROJECTOR

(75) Inventor: Ken Wada, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,352

(22) Filed: Oct. 6, 1997

(30) Foreign Application Priority Data

Oct. 4, 1996 (JP) ............................................. 8-283361
Oct. 2, 1997 (JP) ............................................. 9-286044

(51) Int. Cl.$^7$ ............................................... F21V 29/00
(52) U.S. Cl. .............................. 362/268; 362/31; 362/34
(58) Field of Search ................................ 362/268, 293, 362/294, 349; 353/5, 7, 8, 31, 34, 37, 84

(56) References Cited

U.S. PATENT DOCUMENTS

| | | | |
|---|---|---|---|
| 5,098,184 A | | 3/1992 | van den Brandt et al. .. 353/102 |
| 5,161,042 A | | 11/1992 | Hamada ........................ 349/62 |
| 5,634,704 A | * | 6/1997 | Shikama et al. ............... 353/31 |
| 5,662,402 A | * | 9/1997 | Kim ............................ 353/119 |
| 5,822,128 A | * | 10/1998 | Sekine ......................... 359/650 |

* cited by examiner

Primary Examiner—Sandra O'Shea
Assistant Examiner—John Anthony Ward
(74) Attorney, Agent, or Firm—Morgan & Finnegan, LLP

(57) ABSTRACT

This specification discloses an illuminating apparatus of which the light emergence side is telecentric having an optical system for applying white light from a light source to a surface to be illuminated, the optical system being provided with a first lens having positive refractive power and a second lens having negative refractive power, the first lens and the second lens differing in Abbe's number from each other.

53 Claims, 8 Drawing Sheets

ILLUMINATING APPARATUS AND PROJECTOR

BACKGROUND OF THE INVENTION

1. Field of the Invention

This invention relates to an illuminating apparatus and a projector, which is suitable, for example, for a liquid crystal projector for enlarging and projecting an image displayed on a liquid crystal display device onto a screen by a projection lens.

2. Related Background Art

Recently, a liquid crystal projector for enlarging and projecting an image displayed on a liquid crystal display device onto a screen by a projection lens is known as a large dynamic image display apparatus. In such a liquid crystal projector, it is a technical task to increase the illuminance on the screen, and for this purpose, a microlens is disposed on each liquid crystal pixel to thereby increase the numerical aperture of each pixel.

FIG. 1 of the accompanying drawings is a schematic view of the essential portions of a single plate type liquid crystal projector disclosed in Japanese Laid-Open Patent Application No. 4-60538. In FIG. 1, the reference numeral 101 designates a white light source, and the reference numeral 102 denotes a spherical mirror, of which the center of curvature lies at the position of the white light source 101. The reference numeral 103 designates a condenser lens, of which the forward focus lies at the position of the white light source 101. The reference characters 104R, 104G and 104B denote dicroic mirrors having the characteristic of selectively reflecting lights of the red, green and blue wavelength zones and transmitting other two wavelength zones therethrough. The reflecting surfaces of the three dichroic mirrors are not all parallel to one another, but are designed such that an incident light becomes three rays of light slightly different in angle after the lights of respective wavelength zones are reflected by the three mirrors. The reference numeral 120 designates a transmission type liquid crystal display device, and a microlens array 110 is attached to the light incidence side thereof. The reference numeral 105 denotes a field lens, the reference numeral 106 designates a projection lens for enlarging and projecting an image displayed on a liquid crystal display element 120, and the reference numeral 107 denotes a screen.

The action of this example of the prior art will now be described. Light emitted by the white light source 101 is made into a substantially parallel light beam by the condenser lens 103 and enters the group of dichroic mirrors. First, the dichroic mirror 104R reflects red light in the white light and transmits the remainder therethrough. Then, the dichoroic mirror 104G reflects green light in the remaining light. Then, the dichroic mirror 104B reflects the remaining blue light. Accordingly, the white light is reflected by the group of dichroic mirrors and becomes red light, green light and blue light different in direction and thereafter travels toward the liquid crystal display element 120.

FIG. 2 of the accompanying drawings is an illustration of the action near the liquid crystal display element of FIG. 1. In FIG. 2, the reference numeral 122 designates the scanning electrode of the liquid crystal display element, and the reference characters 121B, 121G and 121R denote the signal electrodes of a blue pixel, a green pixel and a red pixel, respectively. By exciting each signal electrode, the pixel in the portion of the signal electrode can be controlled. A set of R, G and B pixels corresponds to a single microlens.

In this case, red illuminating light entering a microlens is condensed on the portion of the R pixel corresponding to this microlens, and green illuminating light and blue illuminating light entering the microlens are likewise condensed on the portions of the G pixel and the B pixel, respectively, corresponding to the microlens. Thereby, with the white light source as a light source, the R, G and B pixels of the single plate liquid crystal display element are illuminated with the red illuminating light (R), the green illuminating light (G) and the blue illuminating light (B), respectively, without the use of color filters.

Turning back to FIG. 1, the image displayed on the liquid crystal display element is made into a color image by the above-described action, and is enlarged and projected onto the screen 107 by the field lens 105 and the projection lens 106.

According to the construction of this example of the prior art, the absorption loss by each color filter becomes null and therefore, it is possible to increase the illuminance on the screen to the level of a three-plate type projector.

FIG. 3 of the accompanying drawings is an illustration of the task of the single plate type liquid crystal display device of FIG. 1 showing the arrangement of the red (R), green (G) and blue (B) pixels. R, G and B represent pixels for red, green and blue, respectively, and for example, red light reflected by a red reflecting dichroic mirror in a color resolving system enters the pixel R for red, green light reflected by a green reflecting dichroic mirror enters the pixel G for green, and blue light reflected by a blue reflecting dichroic mirror enters the pixel B for blue.

The red illuminating light resolved by the color resolving system and entering the liquid crystal display device is imaged on the liquid crystal display device with a width RL indicated in FIG. 3 by the microlens formed on the aforedescribed pixel.

Assuming that the light emergence side of an illuminating apparatus (101–103 in FIG. 1) for illuminating the liquid crystal display device is not telecentric relative to white light and there is a difference in the angle of incidence of the red illuminating ray of light between the center and corners of the display surface of the liquid crystal display device, even if with regard to the pixel R for red at the center of the display surface, the width RL depicted by a dotted line can be adjusted so as to be within the R pixel, the red illuminating light entering the pixels in the peripheral portion of the display surface is imaged while deviating relative to the center of the pixel as indicated by dots-and-dash line in FIG. 1. In this case, with regard to the R pixels in the peripheral portion of the liquid crystal display device, the loss of the quantity of light occurs and further, a phenomenon such as the color irregularity of the peripheral portion due to the fact that the red illuminating light which originally should enter the R pixel enters the G pixel to be displayed by green occurs and the quality of image is reduced.

SUMMARY OF THE INVENTION

It is the object of the present invention to provide an illuminating apparatus and a projector which are good in telecentric characteristic with respect to white light.

A first aspect of the present invention is an illuminating apparatus of which the light emergence side is telecentric and a projector having the same, and in which an optical system for applying white light from a light source to a surface to be illuminated is provided with a first lens having positive refractive power and a second lens having negative refractive power, the first lens and the second lens differing in Abbe's number from each other.

A second aspect of the present invention is an illuminating apparatus of which the light emergence side is telecentric and a projector having the same, and which have a light condensing optical system for condensing white light from a light source on a surface to be illuminated and a directing optical system for directing the white light from the light source to the condensing optical system, the directing optical system having a relay lens provided with a lens having positive refractive power and a lens having negative refractive power, the positive and negative lenses differing in Abbe's number from each other.

A third aspect of the present invention is an illuminating apparatus of which the light emergence side is telecentric and a projector having the same, and which have an optical integrator, a directing optical system for directing white light from a light source to the optical integrator, a condenser lens for condensing the light from the optical integrator on a surface to be illuminated, color resolving means for resolving the white light from the condenser lens into red, green and blue lights and causing the red light, the green light and the blue light to enter the surface to be illuminated from different directions, and a relay lens for relaying the light from the integrator to the condenser lens, the relay lens being provided with a lens having positive refractive power and a lens having negative refractive power, the positive and negative lenses differing in Abbe's number from each other.

DESCRIPTION OF THE PREFERRED EMBODIMENTS

Figure 4:
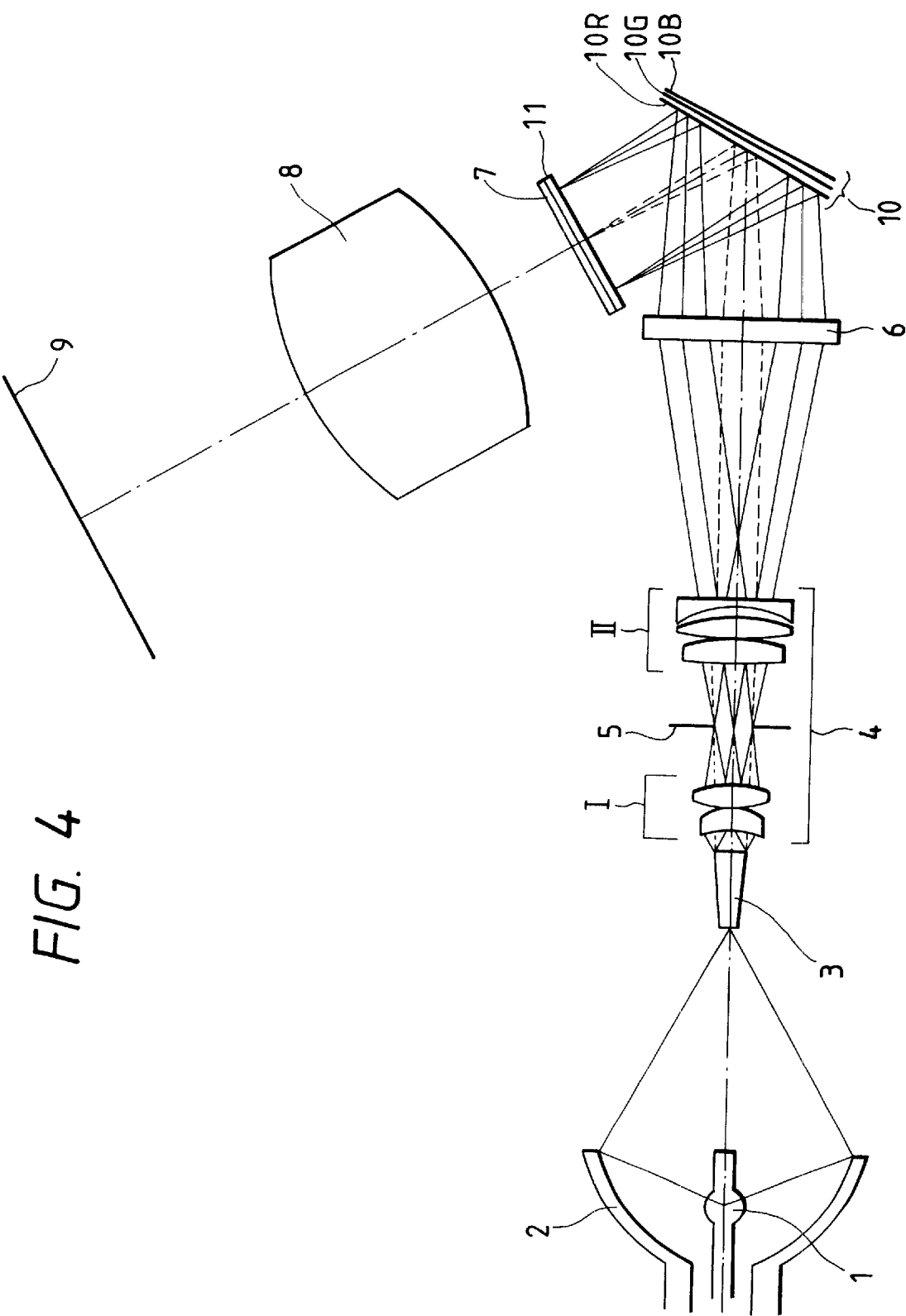
FIG. 4 is a schematic view of the essential portions of Embodiment 1 of the illuminating optical system of the present invention.

FIG. 4 is a schematic view of the essential portions of embodiment 1 of the illuminating apparatus and projector of the present invention. FIG. 4 shows the liquid crystal projector which illuminates a single plate liquid crystal display element (liquid crystal display device) by an illuminating optical system, and enlarges and projects an image formed through the element onto a screen by a projection lens. In FIG. 4, the reference numeral 1 designates a white light source such as a metal halide lamp, and the reference numeral 2 denotes a reflector (concave mirror) having a spheroidal surface for efficiently reflecting a light beam from the light source.

The reference numeral 3 designates a rod type integrator (irregularity reducing optical element) for reducing the luminance irregularity of the light source, and this integrator is a bar-shaped optical member of which the inner surface is a reflecting surface, and which comprises a solid glass bar or a plastic material or a kaleidoscope. Also, the light emergence surface of this integrator is larger than the light incidence surface thereof. The reference numeral 4 denotes a relay lens comprising, in succession from the light source side, a positive meniscus lens having its concave surface facing the light source side, a biconvex lens, a stop 5, a biconvex lens and a biconcave lens, and a negative lens (an optical element having negative refractive power) having a surface of a smaller radius of curvature disposed on the side opposite to the light source side. The light source side two lenses on the opposite sides of the stop 5 together constitute a first lens unit I, and the opposite side three lenses on the opposite side of the stop 5 together constitute a second lens unit II. Both of the first lens unit I and the second lens unit II have positive refractive power. The positive meniscus lens and the biconvex lenses are optical elements having positive refractive power.

The reference numeral 6 designates a Fresnel lens (a condensing optical system) which is an optical element having positive refractive power. The reference numeral 10 denotes a color resolving system comprising a dichroic mirror 10R reflecting red light, a dichroic mirror 10G reflecting green light, and a dichroic mirror 10B reflecting blue light, and these three dichroic mirrors are all slightly inclined with respect to parallelism, and divide white light entering the color resolving system 10 into lights of three colors slightly differing in the direction of travel from one another. The reference numeral 7 designates a liquid crystal display device having an array of microlenses 11 attached to the light source side of each pixel thereof. The reference numeral 8 denotes a projection lens for enlarging and projecting an image displayed on the liquid crystal display device, and the reference numeral 9 designates a screen. Of the above-described elements, the reflector 2, the rod integrator 3, the relay lens 4, etc. each constitute an element of the directing optical system.

Also, the light source 1, the reflector 2, the rod integrator 3, the relay lens 4, the Fresnel lens 6, etc. each constitute an element of the illuminating apparatus.

The action of the present embodiment will now be described. The white light emitted from the light source 1 is reflected by the reflector 2 and forms the image of the light source on the end surface (light incidence surface) of the integrator 3. The integrator 3 divides the image of the light source at the entrance thereof into a plurality of images, and the first lens unit of the relay lens 4 again uniformly forms the image of the light source at the position of the stop 5. This is a second light source image. The light from this second light source image is enlarged by the second lens unit II of the relay lens and the Fresnel lens, and is made into a light beam slightly differing in direction for each of the colors R, G and B by the color resolving system 10 and illuminates the liquid crystal display device 7. At this time, each principal ray of the illuminating light beam (red light, green light and blue light) emerging from the center of the stop 5 is made into substantially parallel light with respect to the optical axis after it emerges from the Fresnel lens 6, and enters the color resolving system 10. That is, the illuminating light beam enters the color resolving system 10 in telecentric state. Therefore, the band shift, i.e., the color irregularity, by the irregularity of the angles of incidence in the surfaces of the dichroic mirrors can be minimized.

The principal ray emerging from the center of the stop 5 enters the liquid crystal display device 7 as parallel light for each color.

The lights reflected by the dichroic mirrors enter the microlenses 11, and are condensed and enter the pixels for respective colors disposed at different positions for R, G and B colors by the microlenses 11, and illuminate the monochromatic R, G and B pixels with the respective colors.

Thus, the image displayed by the colored R, G and B pixels is enlarged and projected onto the screen 9 by the projection lens 8.

In the present embodiment, the light emergence surface of the integrator 3 and the light incidence surface of the liquid crystal display device are made optically conjugate with each other.

While in the present embodiment, the Fresnel lens 6 changes the principal ray divergently emerging from the relay lens 4 into a principal ray parallel to the optical axis to thereby realize telecentric illuminating this Fresnel lens 6 creates great off-axis aberrations, particularly distortion and chromatic aberration. So, in the present embodiment, the negative lens disposed in the second lens unit II of the relay lens 4 is appropriately set to thereby correct the off-axis aberrations well. Thereby, the irregularity of the angle of the illuminating light is reduced with respect to all of the three colors from the center to the corners of the image plane, and the color mixing and the loss of the quantity of light on the liquid crystal display device are suppressed.

Also, in the present embodiment, a relay lens of a type forming the light source image between the first lens unit I and the second lens unit II is adopted to thereby correct the aforementioned distortion, etc. well.

Also, when the focal length of the entire relay lens system is defined as f and the focal length of the first lens unit I is defined as $f_1$, the focal length $f_1$ of the first lens unit I in the present embodiment satisfies the condition that $$f_1/f < 0.85. \quad (1)$$

If the upper limit of this conditional expression (1) is exceeded, the principal point interval of the relay lens 4 will become great and the full length of the relay lens will become great, or the refractive power of the second lens unit II will become strong and as the result, it will become impossible to correct the great distortion, etc. created in the positive lens in the second lens unit II and the Fresnel lens 6.

When the average Abbe's numbers of the positive lens and the negative lens in the second lens unit II (for example, when there are a plurality of positive lenses, the average value of the Abbe's numbers of the plurality of positive lenses) are defined as $\nu_{2p}$ and $\nu_{2n}$, respectively, the condition that $$\nu_{2p}/\nu_{2n} > 1.7 \quad (2)$$

is satisfied in the present embodiment. If the second lens unit II is formed of a glass material within this condition, chromatic difference of magnification in particular can be corrected well. Thereby, with respect also to the R, G and B rays of light entering the liquid crystal display device, the irregularity of the angles of the rays of light from the center to the corners of the liquid crystal display device is reduced to thereby efficiently suppress the color mixing and the loss of the quantity of light on the liquid crystal display device.

The data of the illuminating optical system in the present embodiment will be shown in Numerical Value Embodiment 1 below.

The concave mirror in the present embodiment is a spheroidal mirror, but alternatively this concave mirror may be a spherical mirror or in some cases, may be a parabolic-surfaced mirror. In any case, a good illuminating optical system will be provided if the relay lens is formed including an appropriate negative lens in the second lens unit.

Also, the irregularity reducing optical element in the present embodiment is a rod type integrator, but alternatively the integrator may be replaced by a fly-eye lens. In that case, the image of the light source can be formed on the light incidence surface of the fly-eye lens and the illuminating optical system can be constructed so that this light incidence surface and the light incidence surface of the liquid crystal display device may become optically conjugate with each other.

Also, the condensing optical system in the present embodiment is a Fresnel lens, but in some cases, it may be constructed of an aspherical lens.

Also, an aspherical lens may be provided in the relay lens, whereby the principal rays of the light beam illuminating the peripheral portion of the liquid crystal display device can be minutely controlled, so that the principal rays may more strictly enter the liquid crystal display device perpendicularly thereto or at a predetermined angle with respect thereto in parallelism to each other.

Figure 1:
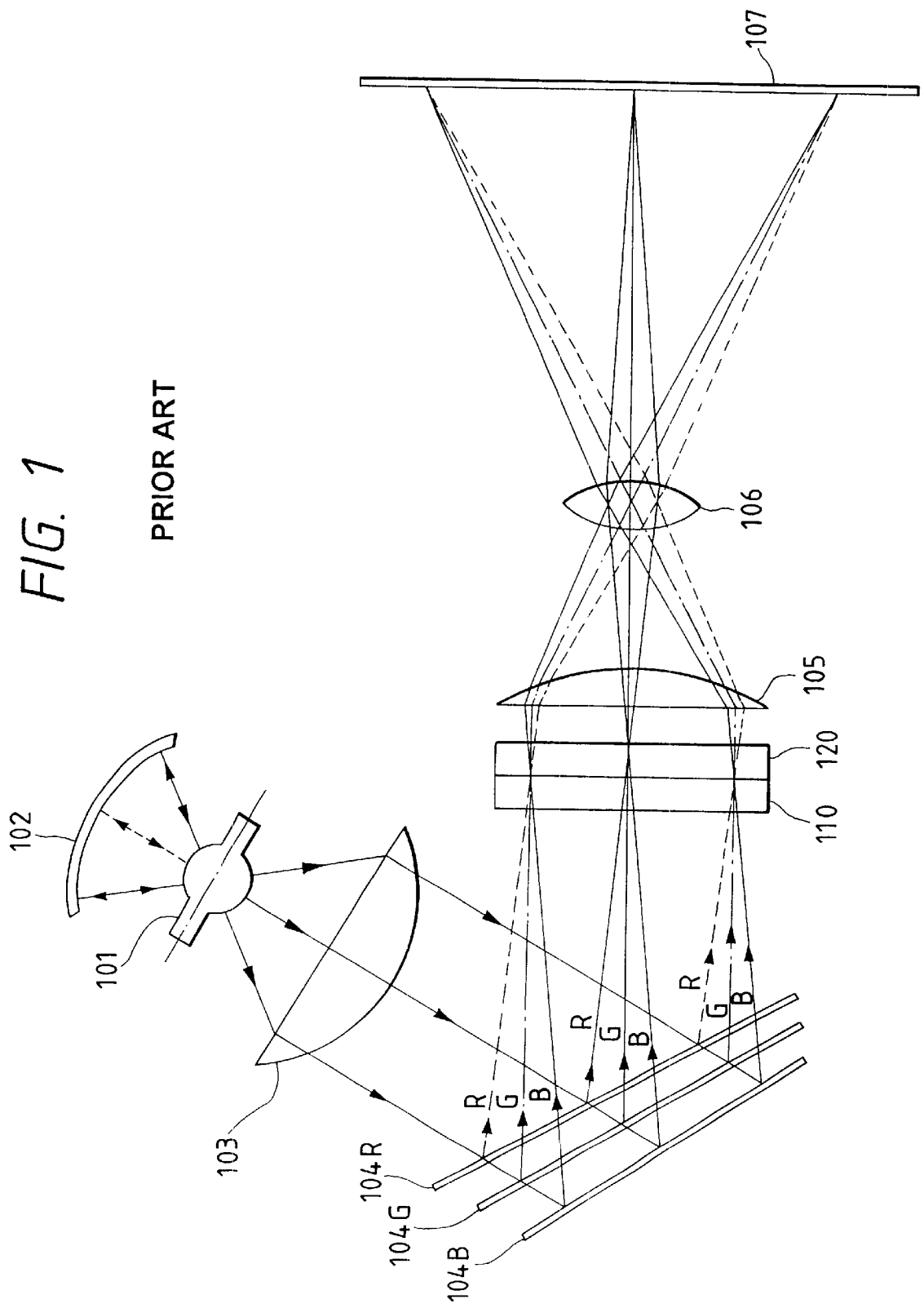
FIG. 1 is a schematic view of the essential portions of a single plate type liquid crystal projector according to the prior art.
Figure 2:
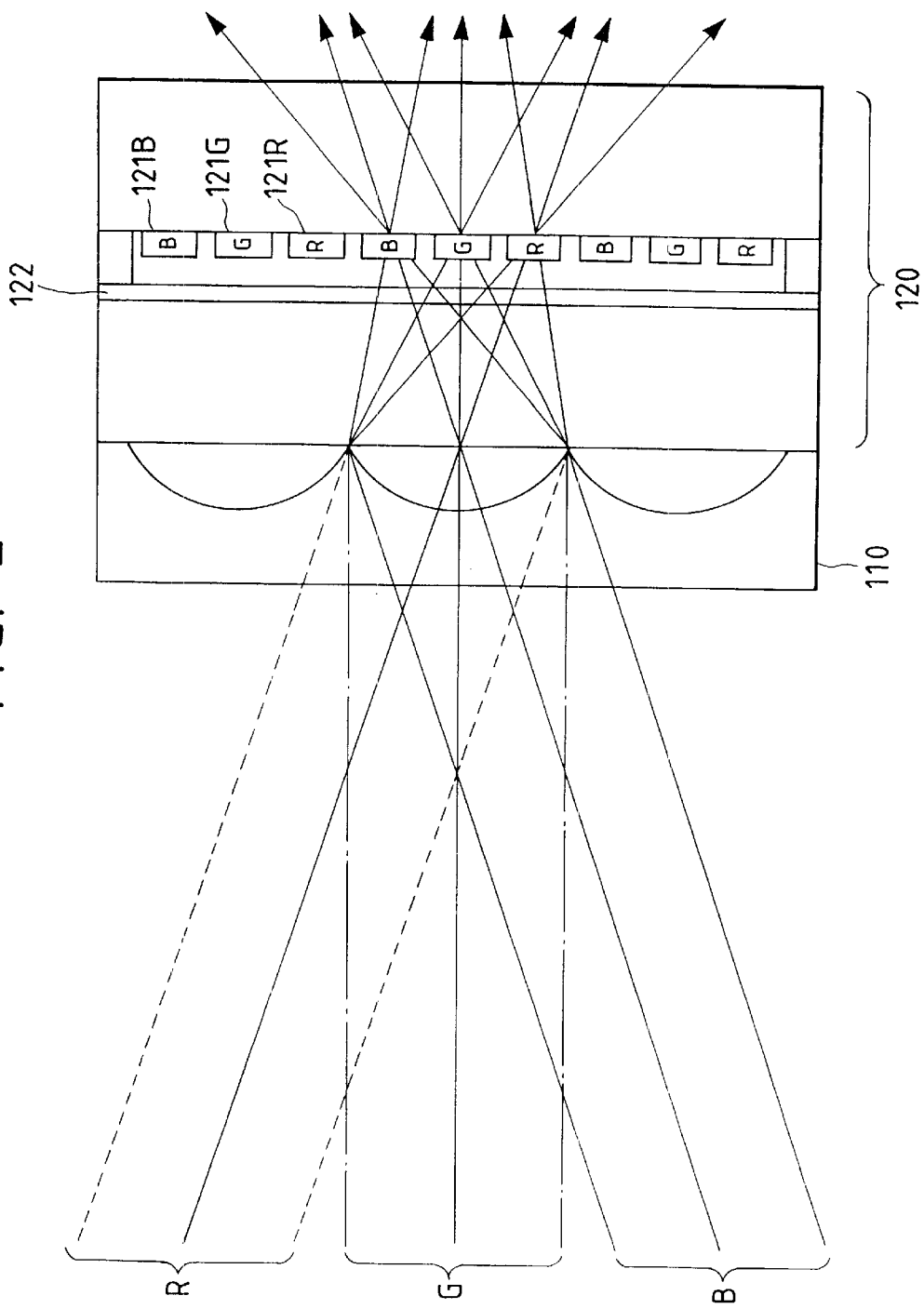
FIG. 2 is an illustration of the action near the liquid crystal display element of the single plate type liquid crystal projector according to the prior art.
Figure 3:
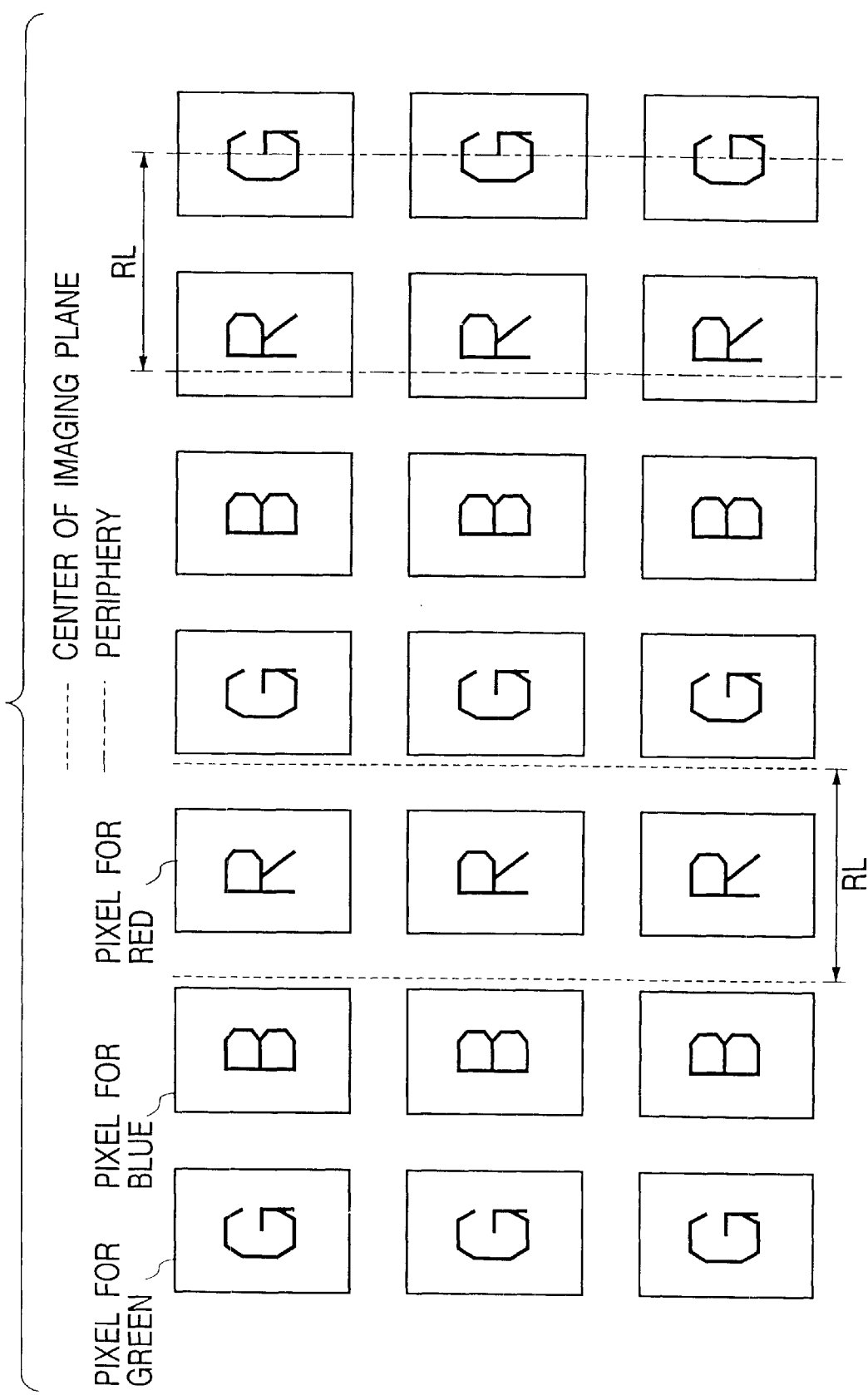
FIG. 3 is an illustration of the task of the single plate type liquid crystal projector according to the prior art.

While the liquid crystal projector of FIG. 1 is a single plate type liquid crystal projector, the present invention can also be applied to a so-called three-plate type liquid crystal projector which directs light beams of three colors from the color resolving system to different liquid crystal display devices, projects the respective light beams onto a single screen by discrete projection lenses and forms an image of full color on the screen.

As the color resolving system, use can also be made of a color resolving system using a conventional diffraction grating.

Figure 5:
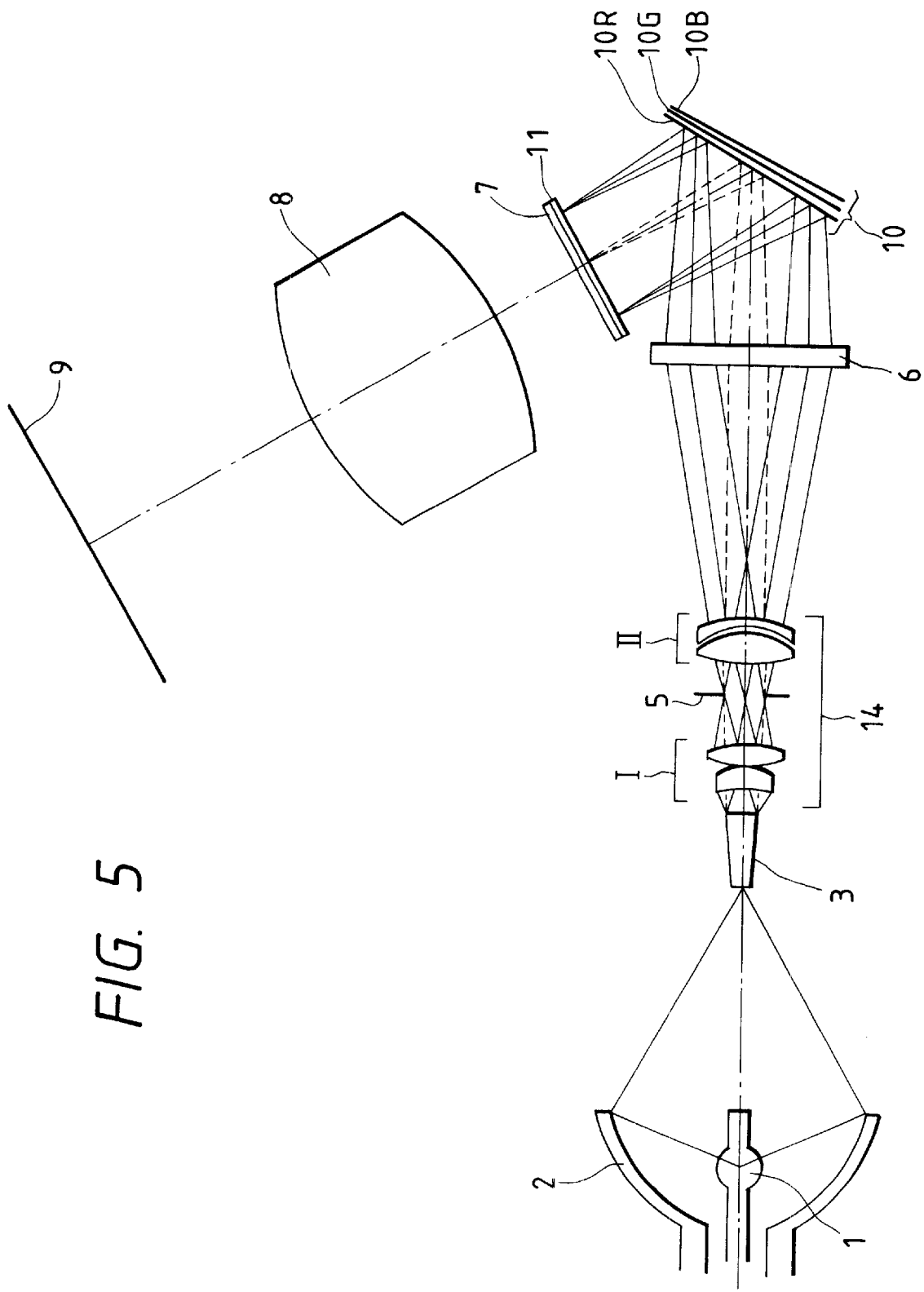
FIG. 5 is a schematic view of the essential portions of Embodiment 2 of the illuminating optical system of the present invention.

FIG. 5 is a schematic view of the essential portions of Embodiment 2 of the illuminating apparatus and projector of the present invention.

This embodiment differs in only the construction of the relay lens Embodiment 1 and is the same as Embodiment 1 in the other portions. That is, the relay lens 14 in the present embodiment is of four-lens construction, and comprises, in succession from the light source 1 side, a positive meniscus lens having its concave surface facing the light source 1, a biconvex lens, a stop 5, a biconvex lens and a negative meniscus lens (an optical element having negative refractive power) having its concave surface facing the light source side. The two lenses on the light source side with the stop 5 interposed therebetween together constitute a first lens unit I, and the two lenses on the opposite side with the stop 5 interposed therebetween together constitute a second lens unit II. Both of the first lens unit I and the second lens unit II have positive refractive power. Also, the positive meniscus lens and the biconvex lenses are optical elements having positive refractive power.

In the case of the present embodiment, the reflector 2, the rod integrator 3, the relay lens 14, etc. each constitute an element of the directing optical system.

Also, the light source 1, the reflector 2, the rod integrator 3, the relay lens 14, the Fresnel lens 6, etc. each constitute an element of the illuminating apparatus.

The operational effect of the present embodiment is the same as that of embodiment 1.

Again in the present embodiment, the Fresnel lens 6 changes principal rays divergently emerging from the relay lens 14 into principal rays parallel to the optical axis to thereby realize telecentric illumination, but this Fresnel lens 6 creates great off-axis aberrations, particularly distortion and chromatic aberration. So, in the present embodiment, the negative lens disposed in the second lens unit II of the relay lens 14 is appropriately set to thereby correct the great off-axis aberrations well. Thereby, with respect to the light of each color, the irregularity of the angles of incidence of the rays of light is reduced from the center to the corners of the image plane to thereby suppress the color mixing and the loss of the quantity of light on the liquid crystal display device.

Also, in the present embodiment, a second light source image is formed between the first lens unit I and the second lens unit II to thereby correct the aforementioned distortion, etc. well.

Again in the present embodiment, the focal length f of the entire relay lens system and the focal length $f_1$ of the first lens unit I satisfy the aforementioned conditional expression (1).

Also, again in the present embodiment, the average Abbe's numbers $v_2$ and $v_{2n}$ of the positive lens and the negative lens in the second lens unit II satisfy the aforementioned conditional expression (2).

Further, again in the present embodiment, the negative lens in the second lens unit II is disposed most adjacent to the liquid crystal display device in the second lens unit II to thereby suppress the color mixing and the loss of the quantity of light on the liquid crystal display device well.

Numerical Value Embodiment 1 below is the data from the light source image to the liquid crystal display device Embodiment 1 (however, the color resolving system is omitted). In the data below, ri is the radius of curvature of the ith surface, di is the interval from the ith surface to the (i+1)th surface, nd is the refractive index for d line, and vd is the Abbe's number.

| i | ri | di | nd | vd | |
|---|---|---|---|---|---|
| light source image | | 42.00000 | | | |
| 1 | −32.69262 | 6.85000 | 1.516330 | 64.15 | |
| 2 | −10.85098 | 0.49000 | 1. | | |
| 3 | 49.53348 | 6.00000 | 1.516330 | 64.15 | |
| 4 | −26.49604 | 16.82464 | 1. | | |
| 5 | 0.00000 | 18.37176 | 1. | | stop |
| 6 | 222.04380 | 6.00000 | 1.516330 | 64.15 | |
| 7 | −47.17275 | 0.20000 | 1. | | |
| 8 | 111.80370 | 6.50000 | 1.516330 | 64.15 | |
| 9 | −37.94266 | 1.67000 | 1. | | |
| 10 | −27.35538 | 2.00000 | 1.620041 | 36.26 | |
| 11 | 3803.13100 | 80.96000 | 1. | | |
| 12 | 0.00000 | 2.5 | 1.49171 | 57.4 | Fresnel lens |
| 13* | −56.75 | 114.718 | 1. | | | liquid crystal display device
*aspherical surface K = −0.522915, A = B = C = D = O ri=0 represents a flat surface. Also, the thirteenth surface of the Fresnel lens is an aspherical surface, and an aspherical surface in which the curvature of the peripheral portion is small relative to the central portion. K, A, B, C, D and the aspherical surface will be described later.

The values of conditional expressions (1) and (2) of Numerical Value Embodiment 1 are $f_1/f=0.82<0.85$ $v_{2p}/v_{2n}=1.77>1.7$ which satisfy the conditions.

Figure 6:
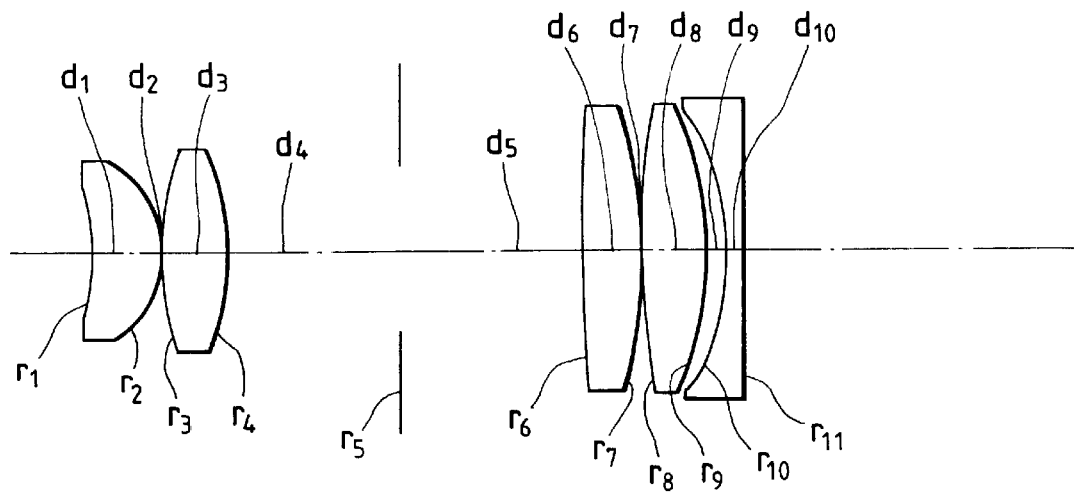
FIG. 6 is a cross-sectional view of Numerical Value Embodiment 1 of the illuminating optical system of the present invention.

FIG. 6 shows a cross-sectional view of the relay lens of Numerical Embodiment 1.

Numerical Value Embodiment 2 below is the data from the light source image to the liquid crystal display device of Embodiment 2 (however, the color resolving system is omitted).

| i | ri | di | nd | vd | |
|---|---|---|---|---|---|
| light source image | | 42.00000 | | | |
| 1 | −57.06531 | 7.30000 | 1.516330 | 64.15 | |
| 2 | −12.49949 | 0.20000 | 1. | | |
| 3 | 38.63656 | 5.85000 | 1.516330 | 64.15 | |
| 4 | −29.74778 | 16.48378 | 1. | | |
| 5 | 0.00000 | 8.55050 | 1. | | stop |
| 6 | 119.38490 | 8.25000 | 1.516330 | 64.15 | |
| 7 | −20.87900 | 1.24000 | 1. | | |
| 8 | −17.13828 | 2.00000 | 1.620041 | 36.26 | |
| 9 | −34.36399 | 95.99000 | 1. | | |
| 10 | 0.00000 | 2.5 | 1.49171 | 57.4 | Fresnel lens |
| 11* | −56.75 | 114.718 | 1. | | | liquid crystal display device
*aspherical surface K = −0.522915, A = B = C = D = O ri=0 represents a flat surface. Also, the thirteenth surface of the Fresnel lens is an aspherical surface, and an aspherical surface in which the curvature of the peripheral portion is small relative to the central portion. The expressions of K, A, B, C, D the aspherical shape will be described later.

The values of conditional expressions (1) and (2) of Numerical Value Embodiment 2 are $f_1/f=0.83<0.85$ $v_{2p}/v_{2n}=1.77>1.7$ which satisfy the conditions.

Figure 7:
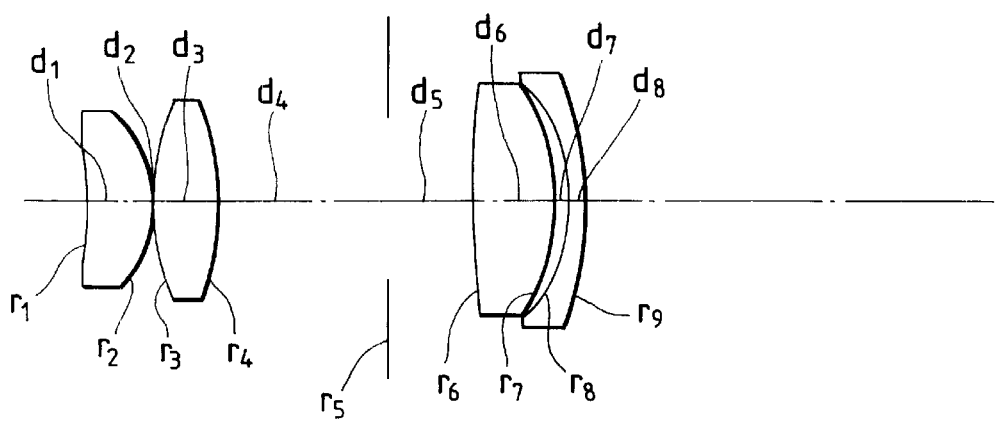
FIG. 7 is a cross-sectional view of Numerical Value Embodiment 2 of the illuminating optical system of the present invention.

FIG. 7 shows a cross-sectional view of the relay lens of Numerical Value Embodiment 2.

Figure 8:
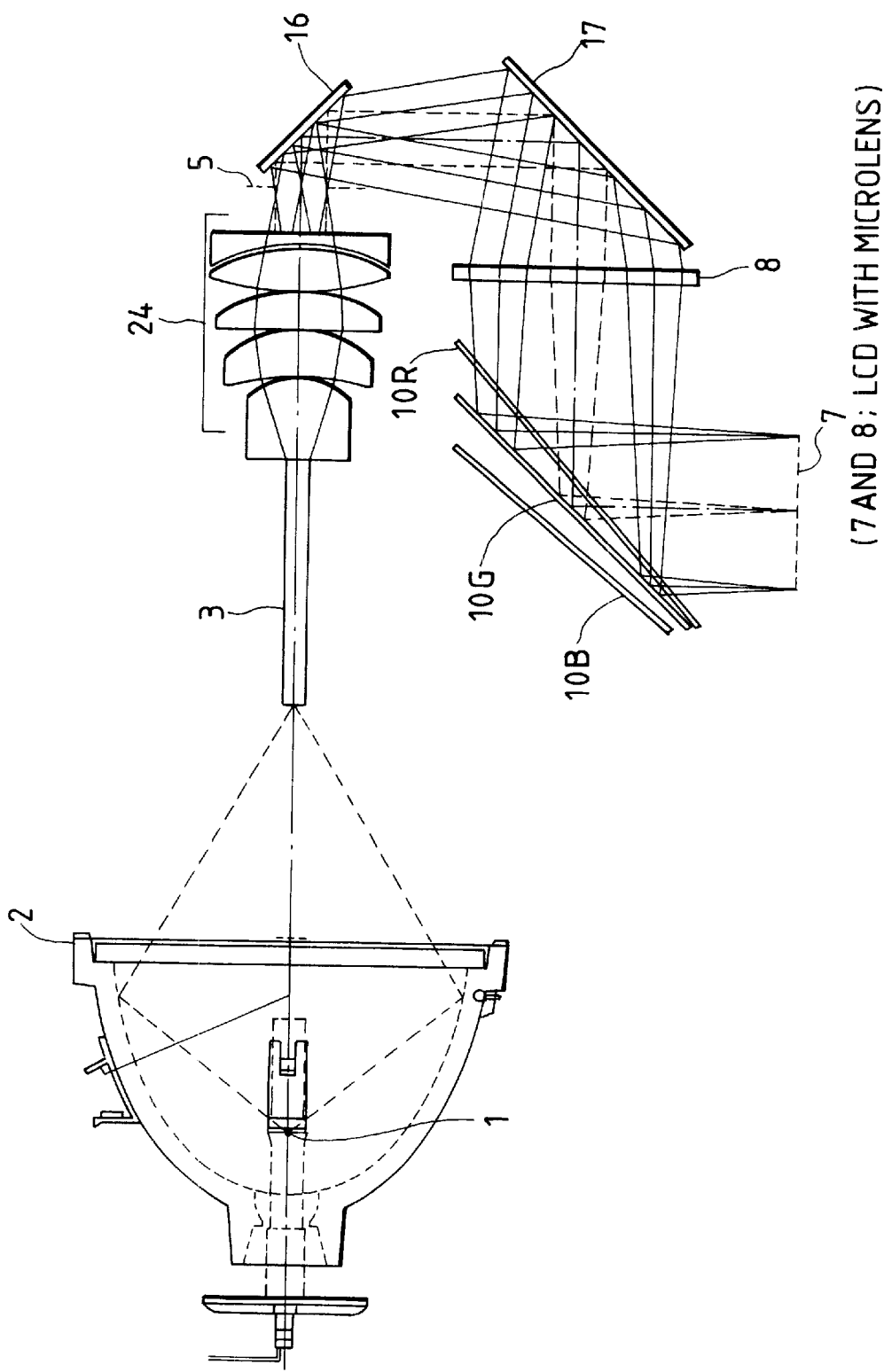
FIG. 8 is a schematic view of the essential portions of Embodiment 3 of the present invention.

Referring now to FIG. 8 which is a schematic view of the essential portions of Embodiment 3 of the illuminating apparatus and projector of the present invention, the reference numeral 1 designates a light source such as a halide lamp, the reference numeral 2 denotes an elliptical reflector for efficiently directing the light from the light source to the entrance opening of a rod integrator 3, the reference numeral 3 designates a rod integrator formed of glass for reflecting the light beam from the light source a plurality of times by four sides of rectangular cross-sectional shape, and the reference numeral 24 denotes a relay lens for re-forming a light source image divided by the integrator 3. The reference numeral 5 designates a stop at the position of which a secondary light source image which is the re-formed image of the light source is formed by the relay lens 24, and the reference numerals 16 and 17 denote reflecting mirrors having a high reflectance for folding the optical path of an illuminating system compactly. The reference numeral 8 designates a Fresnel lens for directing the light beam from the secondary light source image in parallelism to a liquid crystal display device 7 and 8, and the reference characters 10R, 10G and 10B denote red reflecting, green reflecting and blue reflecting dichroic mirrors, respectively.

In this embodiment, the light emergence surface of the rod integrator 3 is rammed against the light incidence surface of that lens in the relay lens which is most adjacent to the light source, whereby dust or the like is prevented from adhering to this surface and also, the holding portion in the emergence opening of the integrator 3 becomes unnecessary. Therefore, the loss of illuminance by this holding portion can be prevented.

Also, the distance between the front unit and the rear unit of the relay lens is shortened and the stop 5 is disposed outside the relay lens unit. Therefore, it becomes possible to dispose the bending mirrors 16 and 17 between the stop 5 and the Fresnel lens 8, and the compactness of the illuminating system is realized.

Also, in the present embodiment, the optical path is developed into a color resolving cross-section by the bending mirrors 16 and 17, whereas this is not restrictive, but the optical path may be of two-storey structure developed in a direction perpendicular to the plane of the drawing sheet of FIG. 8. Thus, according to the present embodiment, there can be realized a very compact single plate type liquid crystal illuminating apparatus.

Numerical Value Embodiment 3 below is the data from light source image to the liquid crystal display device of Embodiment 3 (however, the color resolving system is omitted).

Figure 9:
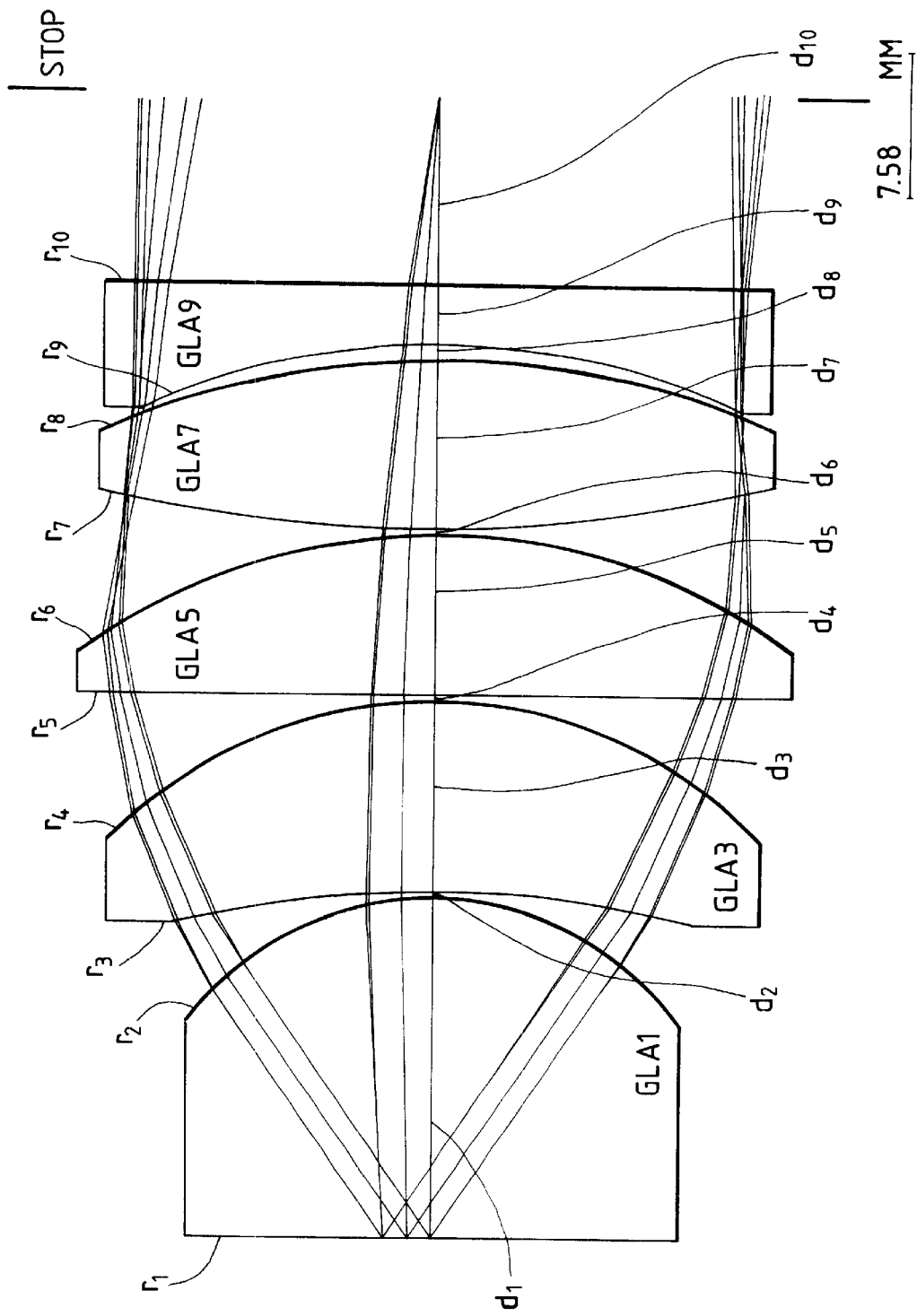
FIG. 9 is a cross-sectional view of Numerical Value Embodiment 3 of the present invention.

FIG. 9 shows a cross-sectional view of the relay lens Numerical Value Embodiment 3.

| i | ri | di | nd | vd | |
|---|---|---|---|---|---|
| light source image | | 36.00 | | | |
| 1 | 0.000 | 18.00 | 1.51805 | 64.2 | |
| 2 | −15.523 | 0.20 | | | |
| 3 | −61.303 | 10.00 | 1.51805 | 64.2 | |
| 4 | −23.035 | 0.20 | 1. | | |
| 5 | 0.000 | 8.50 | 1. | | |
| 6 | −30.911 | 0.20 | 1.51805 | 64.2 | |
| 7 | 74.442 | 9.05 | 1. | | |
| 8 | −41.869 | 0.67 | 1.51805 | 64.2 | |
| 9 | −36.469 | 2.80 | 1. | | |
| 10 | 0.000 | 10.00 | 1.69362 | 31.1 | |
| 11 | 0.000 | 99.00 | 1. | | |
| 12* | 48.268 | 2.50 | 1.49354 | 57.4 | Fresnel lens |
| 13 | 0.000 | 90.00 | 1. | | |
| 14 | 0.000 | 6.39 | 1.49164 | 64.1 | |
| 15 | 0.000 | | 1. | | | liquid crystal display device
*aspherical surface:
K = −0.334694
A = −0.185104 × $10^{-5}$
B = −0.175339 × $10^{-8}$
C = −0.380001 × $10^{-11}$
D = −0.206031 × $10^{-14}$ Here, the shape of the aspherical surface of each embodiment is represented by the following expression:

$$Z = \frac{cr^2}{1 + (1 - (1+K)C^2 Y^2)^{\frac{1}{2}}} + AY^4 + BY^6 + CY^8 + DY^{10}$$

$$c = \frac{1}{R}$$

where Z is the amount of deviation of a point on the lens surface in the direction of the optical axis from a plane perpendicular to the optical axis passing through the vertex of the base spherical surface, Y is the height of this point in the radial direction, and R is the radius of curvature of the base spherical surface.

What is claimed is:

1. An illuminating apparatus for illuminating one or more display devices, said apparatus comprising:

an optical system for condensing light from a light source, having a red, green, and blue spectrum, onto one or more display devices, said optical system including a lens system, having a positive lens, a negative lens, and a condenser lens, wherein said positive and negative lenses are positioned between said condenser lens and the light source and chromatic aberration in said lens system being corrected so that light exiting said lens system is telecentric with respect to each of the red, green and blue spectrum.

2. An illuminating apparatus for illuminating one or more display devices, through a condenser lens with light from a light source, said apparatus comprising:

a directing optical system for directing light from a light source, having a red, green, and blue spectrum, to the condenser lens, said directing optical system includes a positive lens and a negative lens, said positive and negative lenses differ in Abbe's number and are positioned between the light source and the condenser lens so that light exiting said condenser lens is telecentric with respect to each of the red, green and blue spectrum.

3. The apparatus of claim 2, wherein said directing optical system has, in succession from the light source, a first lens unit having positive refractive power and a second lens unit having positive refractive power, said second lens unit being provided with said negative lens.

4. The apparatus of claim 3, wherein said negative lens is provided most adjacent to the condenser lens.

5. The apparatus of claim 3, wherein a radius of curvature of a first surface of said negative lens is adjacent to said light source and is smaller than a radius of curvature of a second surface of said negative lens which is adjacent to said condenser lens.

6. The apparatus of claim 3, wherein said negative lens is a meniscus lens having a concave surface facing said light source or a biconcave lens.

7. The apparatus of claim 3, wherein said first lens unit has two lenses having positive refractive power, and said second lens unit has at least one lens having positive refractive power and said negative lens.

8. The apparatus of claim 7, wherein said two lenses having positive refractive power in said first lens unit are, in succession from the light source, a meniscus lens having a concave surface facing said light source, and a biconvex lens.

9. The apparatus of claim 3, wherein an image of said light source is formed at a position between said first lens unit and said second lens unit.

10. The apparatus of claim 9, which satisfies the following condition:

$f_1/f < 0.85$, where f is a combined focal length of said first lens unit and said second lens unit, and $f_1$ is a focal length of said first lens unit.

11. The apparatus of claim 10, which satisfies the following condition:

$v_{2p}/v_{2n} > 1.7$, where $v_{2p}$ is an average Abbe's number of at least one lens having positive refractive power in said second lens unit and $v_{2n}$ is an average Abbe's number of at least one lens having negative refractive power in said second lens unit.

12. The apparatus of claim 9, which satisfies the following condition:

$v_{2p}/v_{2n} > 1.7$, where $v_{2p}$ is an average Abbe's number of at least one lens having positive refractive power in said second lens unit and $v_{2n}$ is an average Abbe's number of at least one lens having negative refractive power in said second lens unit.

13. The apparatus of claim 3, wherein an image of said light source is formed at a position between said second lens unit and said condenser lens.

14. The apparatus of claim 13, wherein said directing optical system is provided with a mirror for bending the light from said light source between said second lens unit and said condenser lens.

15. An illuminating apparatus for illuminating a display device having an array of lenses positioned at a light incident side thereof, said apparatus comprising:
   a condenser lens;
   a directing optical system for directing light from a light source, having a red, green, and blue spectrum, to said condenser lens; and
   a color separation means for separating light exiting from said condenser lens into red, green, and blue light and for directing the red, green, and blue light onto a display device from different directions, said directing optical system includes a positive lens and a negative lens, said positive and negative lenses differ in Abbe's number and are positioned between the light source and the condenser lens so that light exiting said condenser lens is telecentric with respect to each of said red, green and blue light.

16. The apparatus of claim 15, wherein said color separation means has a diffraction grating or a plurality of dichroic mirrors.

17. The apparatus of claim 15, wherein said condenser lens comprises a Fresnel lens.

18. The apparatus of claim 17, wherein said condenser lens comprises an aspherical lens.

19. The apparatus of claim 17, wherein said directing optical system has, in succession from the light source, a first lens unit having positive refractive power and a second lens unit having positive refractive power, and said second lens unit being provided with said negative lens.

20. The apparatus of claim 19, wherein said negative lens is provided most adjacent to the condenser lens.

21. The apparatus of claim 20, wherein a radius of curvature of a first surface of said negative lens is adjacent to said light source and is smaller than a radius of curvature of a second surface of said negative lens which is adjacent to said condenser lens.

22. The apparatus of claim 21, wherein said negative lens is a meniscus lens having a concave surface facing said light source or a biconcave lens.

23. The apparatus of claim 19, wherein said first lens unit has two lenses having positive refractive power, and said second lens unit has at least one lens having positive refractive power and said negative lens.

24. The apparatus of claim 23, wherein said two lenses having positive refractive power in said first lens unit are, in succession from the light source, a meniscus lens having a concave surface facing said light source, and a biconvex lens.

25. The apparatus of claim 23, wherein an image of said light source is formed at a position between said first lens unit and said second lens unit.

26. The apparatus of claim 25, wherein satisfies the following condition:

$$f_1/f < 0.85,$$

where f is a combined focal length of said first lens unit and said second lens unit, and $f_1$ is a focal length of said first lens unit.

27. The apparatus of claim 26, which satisfies the following condition:

$$v_{2p}/v_{2n} > 1.7,$$

where $v_{2p}$ is an average Abbe's number of at least one lens having positive refractive power in said second lens unit and $v_{2n}$ is an average Abbe's number of at least one lens having negative refractive power in said second lens unit.

28. The apparatus of claim 25, which satisfies the following condition:

$$v_{2p}/v_{2n} > 1.7,$$

where $V_{2p}$ is an average Abbe's number of at least one lens having positive refractive power in said second lens unit and $v_{2n}$ is an average Abbe's number of at least one lens having negative refractive power in said second lens unit.

29. The apparatus of claim 23, wherein an image of said light source is formed at a focus position of said directing optical system between said second lens unit and said condenser lens.

30. The apparatus of claim 29, wherein said directing optical system is provided with a mirror for bending the light from said light source between said second lens unit and said condenser lens.

31. The apparatus of claim 17, wherein said directing optical system has an optical integrator between said light source and said positive and negative lenses, said integrator being provided with a fly-eye lens or a rod for reflecting light by an inner surface of said rod.

32. The apparatus of claim 31, wherein said directing optical system has a spherical mirror or a spheroidal mirror for reflecting light from said light source, and the light reflected by said spherical mirror or said spheroidal mirror enters said positive and negative lenses.

33. An illuminating apparatus for illuminating a display device having an array of lenses positioned at light incident side thereof, said apparatus comprising:
   an optical integrator;
   an optical system for directing light from a light source to said optical integrator;
   a condenser lens for condensing the light from said optical integrator on the display device;
   color separating means for separating the light from the condenser lens into red, green, and blue lights, and causing said red light, said green light and said blue light to enter said surface to be illuminated from mutually different directions; and
   a relay lens for relaying the light from said optical integrator to said condenser lens, said relay lens including a lens having positive refractive power and a lens having negative refractive power; said positive and negative lenses differing in Abbe's number from each other and said positive and negative lenses being located so that light exiting said condenser lenses is made telecentric with respect to each of said red light, said green light and said blue light.

34. The apparatus of claim 33, wherein said color separating means has a diffraction grating or a plurality of dichroic mirrors.

35. The apparatus of claim 33, wherein said condenser lens comprises a Fresnel lens.

36. The apparatus of claim 33, wherein said condenser lens comprises an aspherical lens.

37. The apparatus of claim 33, wherein said relay lens has, in succession from the light source, a first lens unit having positive refractive power and a second lens unit having positive refractive power, said second lens unit provided with said negative lens.

38. The apparatus of claim 37, wherein said negative lens is provided most adjacent to the condenser lens.

39. The apparatus of claim 38, wherein a radius of curvature of a first surface of said negative lens is adjacent to said light source side and is smaller than a radius of curvature of a second surface of said negative lens which is adjacent to said condenser lens.

40. The apparatus of claim 39, wherein said negative lens is a meniscus lens having a concave surface facing said light source, or a biconcave lens.

41. The apparatus of claim 37, wherein said first lens unit has two lenses having positive refractive power, and said second lens unit has at least one lens having positive refractive power and said negative lens.

42. The apparatus of claim 41, wherein said two lenses having positive refractive power in said first lens unit are, in succession from the light source, a meniscus lens having a concave surface facing said light source, and a biconvex lens.

43. The apparatus of claim 41, wherein an image of said light source is formed at a position between said first lens unit and said second lens unit.

44. The apparatus of claim 43, which satisfies the following condition:

$$f_1/f < 0.85,$$

where f is a combined focal length of said first lens unit and said second lens unit, and $f_1$ is a focal length of said first lens unit.

45. The apparatus of claim 44, which satisfies the following condition:

$$v_{2p}/v_{2n} > 1.7,$$

where $v_{2p}$ is an average Abbe's number of at least one lens having positive refractive power in said second lens unit and $v_{2n}$ is an average Abbe's number of at least one lens having negative refractive power in said second lens unit.

46. The apparatus of claim 43, which satisfies the following condition:

$$v_{2p}/v_{2n} > 1.7,$$

where $v_p$ is an average Abbe's number of at least one lens having positive refractive power in said second lens unit and $v_{2n}$ is an average Abbe's number of at least one lens having negative refractive power in said second lens unit.

47. The apparatus of claim 41, wherein an image of said light source is formed at a position between said second lens unit and said condenser lens.

48. The apparatus of claim 33, wherein said directing optical system is provided with a mirror for bending the light from said light source between said second lens unit and said condenser lens.

49. The apparatus of claim 33, wherein said directing optical system has a spherical mirror or a spheroidal mirror for reflecting the light from said light source.

50. A projector having a light valve illuminated by the illuminating apparatus of any of claims 1 to 49, and a projection optical system for projecting an image formed by said light valve.

51. The projector of claim 50, wherein said light valve is a liquid crystal panel.

52. A projector having a light valve illuminated by the illuminating apparatus of any of claims 35 to 49, and a projection optical system for projecting an image formed by said light valve, said light valve having a microlens array for causing said red, green and blue lights to enter different pixels by respective microlenses.

53. The projector of claim 52, wherein said light valve is a liquid crystal panel.

* * * * *

UNITED STATES PATENT AND TRADEMARK OFFICE
CERTIFICATE OF CORRECTION

PATENT NO. : 6,454,438 B1
DATED : September 24, 2002
INVENTOR(S) : Ken Wada

It is certified that error appears in the above-identified patent and that said Letters Patent is hereby corrected as shown below:

<u>Column 7,</u>
Line 21, please delete "$v_2$", and insert therefor -- $v_{2p}$ --

<u>Column 10,</u>
Line 2, please add -- said -- after "onto"
Lines 17-23, starts from said directing should be a new paragraph <u>Column 11,</u>
Lines 21-27, starts from said directing should be a new paragraph <u>Column 14,</u>
Line 9, please delete "$v_p$" and insert therefor -- $v_{2p}$ --

Signed and Sealed this

Twenty-second Day of April, 2003

JAMES E. ROGAN
*Director of the United States Patent and Trademark Office*